US011910232B2

(12) United States Patent
De Kievit et al.

(10) Patent No.: US 11,910,232 B2
(45) Date of Patent: Feb. 20, 2024

(54) SCHEMES AND METHODS OF INTEGRITY PROTECTION IN MOBILE COMMUNICATION

(71) Applicant: NEC Corporation, Tokyo (JP)

(72) Inventors: Sander De Kievit, Tokyo (JP); Hironori Ito, Tokyo (JP); Anand Raghawa Prasad, Tokyo (JP); Takahito Yoshizawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/542,658

(22) Filed: Dec. 6, 2021

(65) Prior Publication Data

US 2022/0095158 A1 Mar. 24, 2022

Related U.S. Application Data

(63) Continuation of application No. 17/284,893, filed as application No. PCT/JP2019/043081 on Nov. 1, 2019, now abandoned.

(30) Foreign Application Priority Data

Nov. 2, 2018 (EP) .................................. 18204190

(51) Int. Cl.
| H04W 4/00 | (2018.01) |
| H04W 28/04 | (2009.01) |
| H04L 1/20 | (2006.01) |
| H04W 8/24 | (2009.01) |
| H04W 12/10 | (2021.01) |

(52) U.S. Cl.
CPC ............. *H04W 28/04* (2013.01); *H04L 1/203* (2013.01); *H04W 8/24* (2013.01); *H04W 12/10* (2013.01)

(58) Field of Classification Search
None
See application file for complete search history.

(56) References Cited

U.S. PATENT DOCUMENTS

| 2010/0128650 | A1 | 5/2010 | Morimoto et al. | |
| 2011/0188408 | A1* | 8/2011 | Yi | H04W 12/102 |
| | | | | 370/254 |
| 2017/0331734 | A1 | 11/2017 | Cariou et al. | |
| 2018/0368196 | A1* | 12/2018 | Gage | H04W 74/006 |
| 2019/0215693 | A1 | 7/2019 | Lee et al. | |
| 2020/0037165 | A1* | 1/2020 | Kunz | H04W 12/106 |

OTHER PUBLICATIONS

International Search Report for PCT Application No. PCT/JP2019/043081, dated Feb. 7, 2020.

(Continued)

*Primary Examiner* — Zewdu A Beyen

(57) ABSTRACT

This invention introduces methods and mechanisms of partial integrity protection in mobile systems. A user equipment (UE), comprising: a memory configured to store instructions; and a processor configured to execute the instructions to: receive, from a network device, user plane data having integrity protection; send an error indication indicating an integrity protection error relating to the user plane data; and receive retransmitted user plane data from the network device with a reduced data rate, based on the error indication.

8 Claims, 17 Drawing Sheets

(56) References Cited

OTHER PUBLICATIONS

English translation of Written opinion for PCT Application No. PCT/JP2019/043081, dated Feb. 7, 2020.
ZTE, "Guarantee the UE Max Data Rate for Integrity Protection", 3GPP Draft R3-181691, 3GPP TSG-RAN WG3 #99bis, Sanya, China, Apr. 16-20, 2018, pp. 1-7.
OPPO, "Discussion on DRB IP failure handling and data recovery", 3GPP Draft R2-1804554, 3GPP TSG-RAN2 #101bis, Sanya, P.R. China, Apr. 16-20, 2018, pp. 1-5.
NEC—Japan invention disclosure, "Integrity protection for user plane data in 5G network" (filing #5050000034), Feb. 2018 (Reference cited in the Specification).
NEC—Japan invention disclosure, "Efficient integrity protection", filing #5050000050, Sep. 2018 (Reference cited in the Specification).
Lenovo et al., "Achieving higher data rates for UP IP", 3GPP S3-182942, 3GPP TSG SA WG3 (Security) Meeting #92 ad-hoc, Harbin, China, Sep. 24-28, 2018.
3GPP RAN2, "UE capability related to integrity protection of DRBs", 3GPP S3-181650, 3GPP TSG SA WG3 (Security) #91 Bis, La Jolla, US, May 21-25, 2018.
3rd Generation Partnership Project, "Technical Specification Group Services and System Aspects; System Architecture for the 5G System; Stage 2 (Release 15)", 3GPP TS 23.501 V15.3.0, Sep. 2018, pp. 1-226.
3rd Generation Partnership Project, "Technical Specification Group Services and System Aspects; Procedures for the 5G System; Stage 2 (Release 15)", 3GPP TS 23.502 V15.3.0, Sep. 2018, pp. 1-329.
3rd Generation Partnership Project, "Technical Specification Group Services and System Aspects; Security architecture and procedures for 5G system (Release 15)", 3GPP TS 33.501 V15.2.0, Sep. 2018, pp. 1-176.
3rd Generation Partnership Project, "Technical Specification Group Radio Access Network; NR; Packet Data Convergence Protocol (PDCP) specification (Release 15)", 3GPP TS 38.323 V15.3.0, Sep. 2018, pp. 1-26.
U.S. Office Action for U.S. Appl. No. 17/284,893 dated Apr. 11, 2022.

* cited by examiner

SCHEMES AND METHODS OF INTEGRITY PROTECTION IN MOBILE COMMUNICATION

CROSS-REFERENCE TO RELATED APPLICATIONS

The present application is a continuation application of U.S. patent application Ser. No. 17/284,893 filed on Apr. 13, 2021, which is a National Stage Entry of international application PCT/JP2019/043081, filed Nov. 1, 2019, which claims the benefit of priority from European Patent Application 18204190.5 filed on Nov. 2, 2018, the disclosures of all of which are incorporated in their entirety by reference herein.

TECHNICAL FIELD

The present disclosure relates to a communication system. The disclosure has particular but not exclusive relevance to wireless communication systems and devices thereof operating according to the 3rd Generation Partnership Project (3GPP) standards or equivalents or derivatives thereof. The disclosure has particular although not exclusive relevance to integrity protection in the so-called '5G' (or 'Next Generation') systems.

BACKGROUND ART

In mobile systems, such as 3GPP defined 2G, 3G, 4G, and 5G systems, confidentiality protection (ciphering) and integrity protection are defined in the respective specifications. In the case of 5G system, the system architecture is specified in Technical Specification (TS) 23.501 [5] and TS 23.502 [6], and the security architecture is defined in TS 33.501 [7].

Confidentiality protection refers to the mechanism in which the content is being concealed from the unintended recipient by use of ciphering (or encryption). Integrity protection refers to the mechanism in which the original content is protected by use of techniques to detect changes in the content when it is received by the intended receiver, thus preventing man-in-the-middle attack.

In 3GPP systems, usage of confidentiality protection and integrity protection are separately defined in Access Stratum (AS) and Non-Access Stratum (NAS), resulting in the following 8 types of protection:

TABLE 1 types of protection in 3GPP systems

| | | Access Stratum (AS) | Non-Access Stratum (NAS) |
|---|---|---|---|
| Control Plane (CP) | Confidentiality protection | Confidentiality protection of CP at AS level | Confidentiality protection of CP at NAS level |
| | Integrity protection | Integrity protection of CP at AS level | Integrity protection of CP at NAS level |
| User Plane (UP) | Confidentiality protection | Confidentiality protection of UP at AS level | Confidentiality protection of UP at NAS level |
| | Integrity protection | Integrity protection of UP at AS level | Integrity protection of UP at NAS level |

NOTE: AS refers to the segment in the mobile system where distinct radio technology is used between the base station and the User Equipment (UE). The radio technology used depends on the generation. NAS refers to the end-to-end connection between the UE and the Core Network (CN) which is independent from the AS (i.e., independent from the underlying radio technology being used).

As shown in Table 1 above, there are total of 8 different types of protection.

In 4G (LTE) and 5G systems, both confidentiality protection and integrity protection in Control Plane (CP) is mandatory. This ensures that signaling to set up a call, execute handover, etc. is protected. However, confidentiality protection and integrity protection in User Plane (UP) is optional. In real-world deployments, either types of protection in UP may not be applied.

Specifically for integrity protection in UP, the reason why it is not mandatory has several reasons: 1) integrity protection is not useful or beneficial in certain traffic types, and 2) limitation in the hardware in terms of performance to perform integrity protection.

For the first case, for example, voice communication requires constant stream of voice information in real-time manner with rather strict time-bound in order to make the voice communication usable. Excessive delay makes the voice communication often unusable. In this context, retransmission usually does not help. Also, voice communication can often tolerate occasional error or packet loss as human voice information is inherently redundant. In this context, use of integrity protection does not add value.

For the second case, it is known [4] that UE has a performance limitation in terms of the maximum data rate of Data Radio Bearer (DRB) for which integrity protection of the entire payload is possible in both UL and DL directions. (NOTE: DRB is a Radio Bearer (RB) that carries the user data, as opposed to Signaling Radio Bearer (SRB) which carries signaling data for both AS and NAS level signaling.) In other words, if the data rate exceeds a certain threshold, the UE can no longer execute the integrity protection to cover the entire payload at PDCP level. On the other hand, if the data rate is below a certain threshold, the UE can perform integrity protection for the entire PDCP PDU payloads. PDCP protocol is defined in [8].

The above described condition of UE's performance limitation is essentially bound by the hardware (i.e. chipset) limitation in the UE.

This condition leads to the following situation:

If the integrity protection for the UP is used and the data rate is below a certain threshold, full integrity protection is possible. In this case, full integrity protection is more beneficial in order to maximize the level of protection.

On the other hand, if the integrity protection for the UP is used and the data rate is above this threshold, full protection is no longer possible. In this case, the integrity protection scheme needs to be changed from full protection to some other scheme, such as switching to partial protection or no protection at all.

Likewise, if the data rate goes down below the threshold, then full integrity protection becomes possible again. In this case, re-applying full integrity protection is beneficial to maximize the level of protection.

The above points imply that there needs to be coordination between the UE and the network, and between Network Elements (NE) to signal and coordinate the integrity protection to be used for the UE.

The above point implies that a mechanism is needed to:
1. Determine the threshold for a given UE.
2. Monitor the data rate of the UE.
3. Determine the integrity protection scheme to be used for a given UE based on the detected data rate against the threshold.

4. Switch the integrity protection scheme based on the above decision.
5. Coordination among UE, RAN node, and CN to conduct the integrity protection scheme change.

There are some prior arts in [1], [2], and [3] in which the concept of "partial integrity protection" is introduced. However, they do not define a mechanism to handle the above 3 points.

SUMMARY OF INVENTION

Technical Problem

Based on the discussion above, we can state the problem as follows:

UE is known to have hardware limitation in terms of data rate (b/s) where integrity protection of the entire PDCP PDU payload can be done. When the data rate exceeds this threshold, either the integrity protection needs to be turned off or partial protection needs to be employed where only a subset of the PDCP payload is integrity protected. This implies that there needs to be a mechanism in place to: 1) determine the threshold for a given UE, 2) measure and determine the data rate, and 3) switch the integrity protection scheme.

There are prior arts where this partial integrity protection is done. However, they do not describe a mechanism to support these stated functionalities.

Solution to Problem

According to an aspect of the present disclosure, a user equipment (UE), includes: a memory configured to store instructions; and a processor configured to execute the instructions to: receive, from a network device, user plane data having integrity protection; send an error indication indicating an integrity protection error relating to the user plane data; and receive retransmitted user plane data from the network device with a reduced data rate, based on the error indication.

According to another aspect of the present disclosure, a method includes: receiving, by a user equipment and from a network device, user plane data having integrity protection; sending, by the UE, an error indication indicating an integrity protection error relating to the user plane data; and receiving, by the UE, retransmitted user plane data from the network device with a reduced data rate, based on the error indication.

According to another aspect of the present disclosure, a network device includes: a memory configured to store instructions; and a processor configured to execute the instructions to: send, to a user equipment (UE), user plane data having integrity protection; receive an error indication indicating an integrity protection error relating to the user plane data; and send, to the UE, retransmitted user plane data with a reduced data rate, based on the error indication.

According to another aspect of the present disclosure, a method includes: sending, by a network device and to a user equipment (UE), user plane data having integrity protection; receiving, by the network device, an error indication indicating an integrity protection error relating to the user plane data; and sending, by the network device and to the UE, retransmitted user plane data with a reduced data rate, based on the error indication.

Advantageous Effects of Invention

With the above configurations, the present disclosure can provide the UE, the network device, the method that solves the problem as mentioned above.

DESCRIPTION OF EMBODIMENTS

Figure 1:
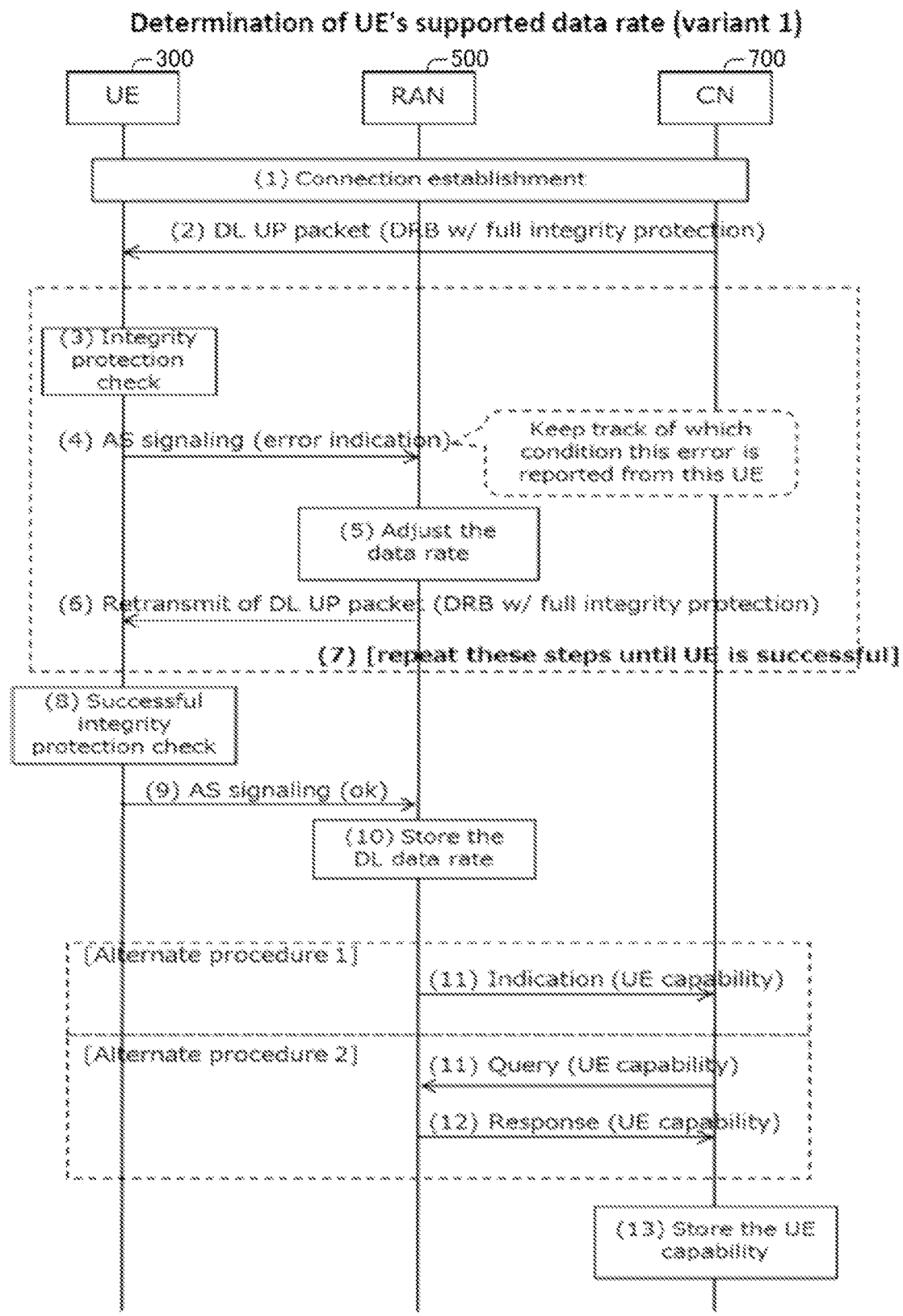
FIG. 1 shows an example of determination of UE's supported data rate.
Figure 2:
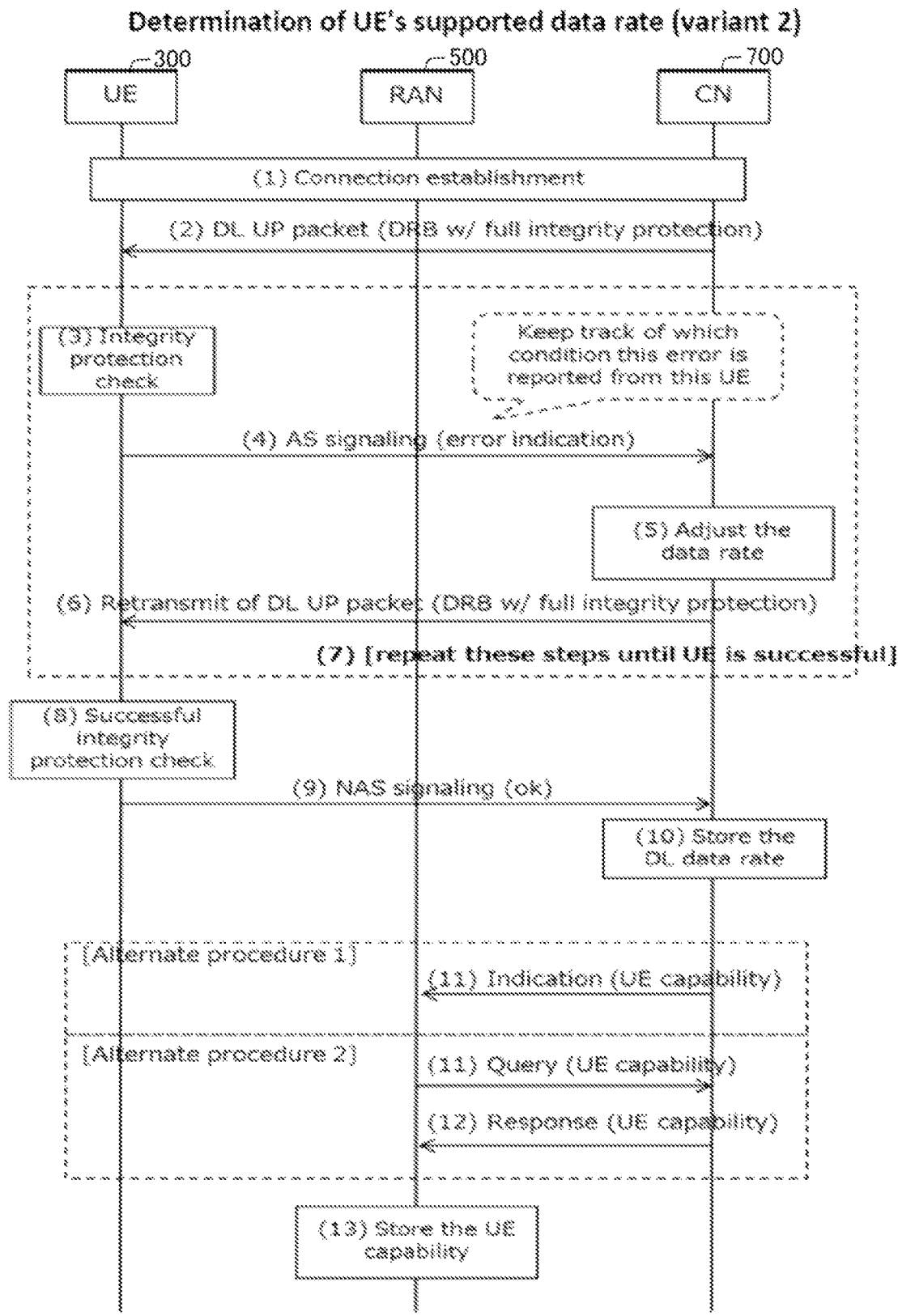
FIG. 2 shows an example of determination of UE's supported data rate.

First Embodiment—Determination of UE's Capability on Full Integrity Protection

Variant 1:

This variant describes the mechanism in which the network determines the UE's capability with respect to the data rate the UE 300 can support full integrity protection. In this variant, the DL UP data rate adjustment (throttling) is done at the RAN node 500. Once the RAN node 500 determines the UE's capability with respect to the DL UP data rate for which it can perform full integrity protection, this capability information for this UE 300 is shared with the CN 700.

The steps are described as follows:
1. Connection is established between the UE 300 and the CN 700.
2. DL UP traffic (e.g., web browsing) is being sent from the CN 700 to the UE 300 via RAN node 500 with full integrity protection.
3. The UE 300 does the integrity protection check on all received packets.
4. If the UE 300 is not able to process all integrity protection check in all received packets in the ongoing data rate, the UE 300 indicates that the UE 300 is not able to process integrity protection for all DL UP packets (error indication) to the RAN node 500, by AS signaling, for example.
5. Upon receiving the indication from the UE 300 for not being able to process integrity protection for all DL UP packets, the RAN node 500 adjusts the data rate of the DL UP traffic. In some aspects, the RAN node 500 throttles down the data rate of the DL UP traffic using a method such as a predetermined value or other heuristic mechanism.
6. The RAN node 500 re-transmits the DL UP packets to the UE 300 with the reduced DL data rate and with full integrity protection.
7. (optional) If necessary, steps 3 through 6 are repeated with additional reduction of the DL UP data rate.
8. Due to the reduction in the data rate, the UE 300 can successfully execute the integrity protection for all DL UP packets.
9. (optional) The UE 300 indicates to the RAN node 500 that the UE 300 can successfully execute the integrity protection for all DL UP packets, by AS signaling, for example. Alternatively, the UE 300 does not send any indication to the RAN node 500, in case the absence of error indication from the UE 300 implies successful handling of integrity protection checking in the UE 300 of all DL UP packets.
10. The RAN node 500 stores the last adjusted DL UP data rate for which the UE 300 successfully executed the integrity protection of all DL UP packets.

Alternate Procedure 1:
11. The RAN node 500 indicates the UE's capability information to the CN 700.

Alternate Procedure 2:
11. The CN 700 queries the RAN node 500 for the UE's capability information.
12. The RAN node 500 responds with the UE's capability information to the CN 700.
13. The CN 700 stores the UE's capability information.

Variant 2:

This variant describes the mechanism in which the network determines the UE's capability with respect to the data rate the UE 300 can support full integrity protection. In this variant, the DL UP data rate adjustment (throttling) is done at the CN 700. Once the CN 700 determines the UE's capability with respect to the DL UP data rate for which it can perform full integrity protection, this capability information for this UE 300 is shared with the RAN node 500.

The steps are described as follows:
1. Connection is established between the UE 300 and the CN 700.
2. DL UP traffic (e.g., web browsing) is being sent from the CN 700 to the UE 300 via RAN node 500 with full integrity protection.
3. The UE 300 does the integrity protection check on all received packets.
4. If the UE 300 is not able to process all integrity protection check in all received packets in the ongoing data rate, the UE 300 indicates that the UE 300 is not able to process integrity protection for all DL UP packets (error indication) to the CN 700, by AS signaling, for example.
5. Upon receiving the indication from the UE 300 for not being able to process integrity protection for all DL UP packets, the CN 700 adjusts the data rate of the DL UP traffic. In some aspects, the RAN node 500 throttles down the data rate of the DL UP traffic using a method such as a predetermined value or other heuristic mechanism.
6. The CN 700 re-transmits the DL UP packets to the UE 300 with the reduced DL data rate and with full integrity protection.
7. (optional) If necessary, steps 3 through 6 are repeated with additional reduction of the DL UP data rate.
8. Due to the reduction in the data rate, the UE 300 can successfully execute the integrity protection for all DL UP packets.
9. (optional) The UE 300 indicates to the CN 700 that the UE 300 can successfully execute the integrity protection for all DL UP packets, by AS signaling, for example. Alternatively, the UE 300 does not send any indication to the CN 700, in case the absence of error indication from the UE 300 implies successful handling of integrity protection checking in the UE 300 of all DL UP packets.
10. The CN 700 stores the last adjusted DL UP data rate for which the UE 300 successfully executed the integrity protection of all DL UP packets.

Alternate Procedure 1:
11. The CN 700 indicates the UE's capability information to the RAN node 500.

Alternate Procedure 2:
11. The RAN node 500 queries the CN 700 for the UE's capability information.
12. The CN 700 responds with the UE's capability information to the RAN node.
13. The RAN node stores the UE's capability information.

Advantages of this variant are summarized as follows:

The network (RAN 500 and CN 700) can automatically determine the UE's capability in terms of the maximum data rate for which the UE 300 can process the full integrity protection.

An explicit indication by the UE 300 to the RAN 500 and CN 700 with respect to its capability (e.g., maximum data rate for which full integrity protection is possible) is not necessary.

This variant works for all UEs irrespective of its indication to the network with respect to the UE's capability of the maximum data rate for which the UE 300 can process the full integrity protection.

The above procedure is required only once per UE 300 because the maximum data rate for which full integrity protection is possible is hardware-bound limitation. Therefore, once this value is known for a given UE 300, it does not change.

In case a user changes a UE hardware, the above procedure can simply be repeated for the network to obtain the new capability information.

Second Embodiment—Control of the Integrity Protection Scheme Selection

This embodiment describes the mechanisms of how the integrity protection between the UE 300 and the RAN node 500 is controlled.

There can be multiple different approaches to achieve the similar end result.

Variant 1:

In this variant, the UE 300 indicates its capability or rule (or its preference) in terms of the use of integrity protection, and the network determines the integrity protection mechanism accordingly under various conditions.

In one example, the UE 300 indicates its preference of the use of integrity protection under different conditions. This is illustrated in Table 2.

TABLE 2

UE's capability (or preference) on integrity protection scheme

| Condition | UE's capability (or preference) |
|---|---|
| 1) metric value < threshold A | Full integrity protection |
| 2) Threshold A <= metric value < threshold B | Full integrity protection or Partial integrity protection |
| 3) Threshold B <= metric value | Partial integrity protection |

In Table 2, "threshold A" and "threshold B" indicate a certain condition for which the UE 300 is under. In one example, the threshold can indicate data rate, such as specific to DL traffic, specific to UL traffic, or both DL and UL traffic. In another example, these thresholds can represent metric other than data rate, such as UE device type, type of services the UE uses, etc.

The following description is based on the data rate being used as the threshold.

Condition 1 indicates the data rate is below a certain threshold for which the UE 300 can perform full integrity protection on all UP traffic. Condition 2 indicates the data rate is in the "border line zone" where the full integrity protection on all UP traffic may not be possible. Under this condition, the UE 300 uses either full or partial integrity protection depending on factors such as the actual traffic rate at the time of transmission or reception, etc. Condition 3 indicates the data rate is above the threshold where the UE 300 can no longer perform full integrity protection on all UP traffic.

In one example, there can be only one threshold or multiple thresholds being indicated by the UE 300 (2 thresholds shown in the example in Table 2).

Threshold A and threshold B in this indication can be determined by the UE 300 or pre-configured in the UE 300 and the network.

The UE 300 indicates this information to the network (RAN 500 and/or CN 700) so that the network side becomes aware of the UE's capability or rule in terms of the data rate it can perform for full integrity protection.

Figure 3:
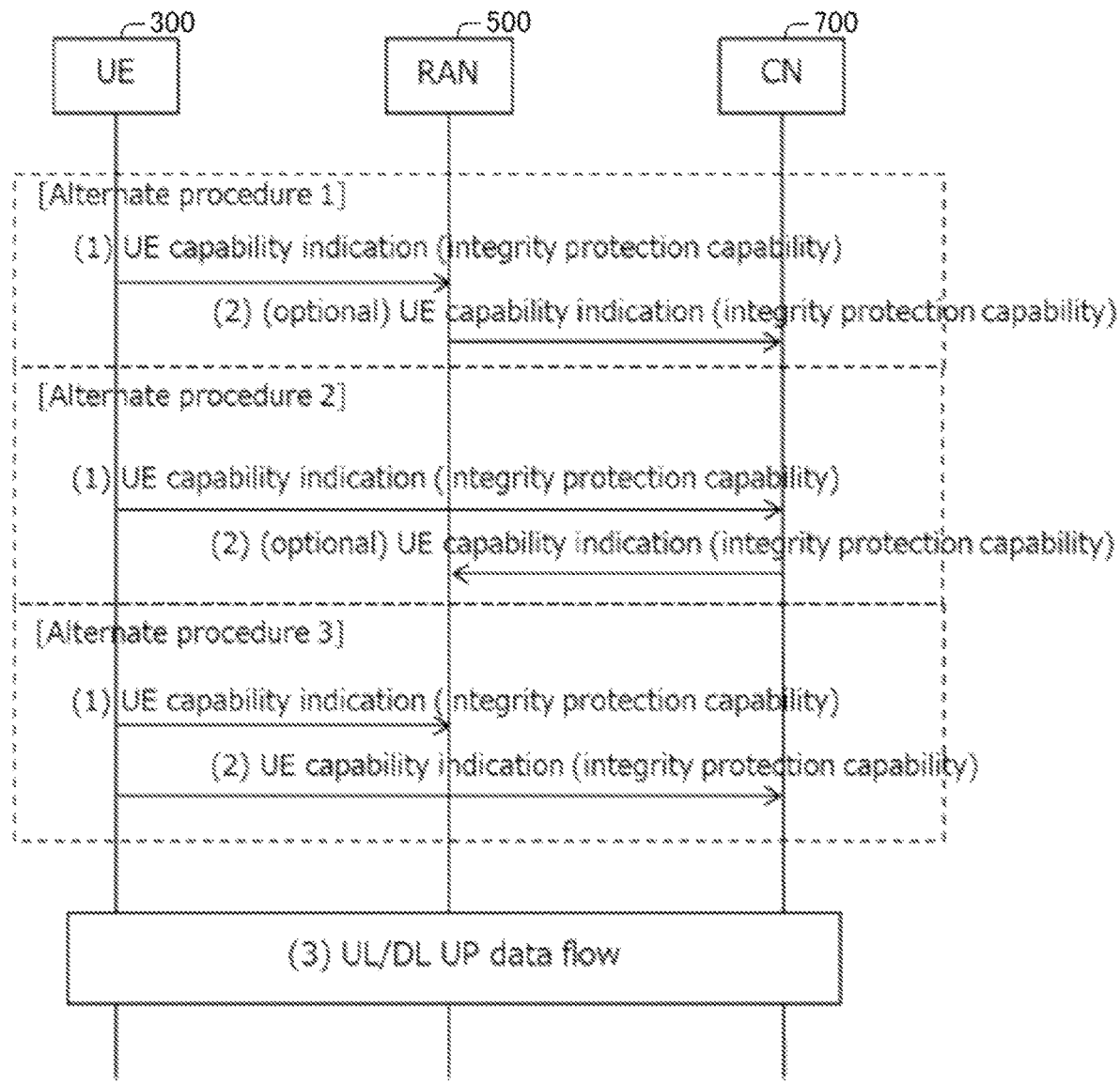
FIG. 3 illustrates several possible procedures for the UE to indicate its capability or rule indication to the RAN and/or CN.

FIG. 3 illustrates several possible procedures for the UE 300 to indicate its capability or rule indication to the RAN 500 and/or CN 700.

In alternate procedure 1, the UE 300 sends the UE capability indication to the RAN node 500, and the RAN node 500 optionally forwards this information to the CN 700. In alternate procedure 2, the UE 300 sends the UE capability indication to the CN 700, and the CN 700 optionally forwards this information to the RAN node 500. In alternate procedure 3, the UE 300 sends the UE capability indication to both RAN node 500 and the CN 700. The UE 300 and the RAN node 500 execute the UP traffic transfer using the integrity protection rule provided by the UE 300.

Advantages of this variant are summarized as follows:
The network (RAN node 500 and/or CN 700) can know the UE's capability as directly informed by the UE 300 itself.
This scheme is beneficial for determining the integrity protection scheme in the RAN node 500 or CN 700 for DL UP traffic.

Variant 2:

In this variant, the RAN node 500 indicates its rule (or preference) to the UE 300 for the integrity protection rule. The integrity protection rule consists of similar type of information as described in variant 1 in the preceding section. But instead of this information being sent by the UE 300, in this variant, the RAN node 500 provides the rule to the UE 300.

In this example, the integrity protection rule can be represented in Table 3.

TABLE 3

RAN node's rule (or preference) on integrity protection scheme

| Condition | RAN node's rule (or preference) |
|---|---|
| 1) metric value < threshold A | Full integrity protection |
| 2) Threshold A <= metric value < threshold B | Full integrity protection or Partial integrity protection |
| 3) Threshold B <= metric value | Partial integrity protection |

In Table 3, "threshold A" and "threshold B" indicate a certain condition for which the UE 300 is under. In one example, the threshold can indicate data rate, such as specific to DL traffic, specific to UL traffic, or both DL and UL traffic. In another example, these thresholds can represent some other metric other than data rate.

The following description is based on the data rate being used as the threshold.

Condition 1 indicates the data rate is below a certain threshold for which the UE 300 is requested to perform full integrity protection on all UP traffic. Condition 2 indicates the data rate is in the "border line zone" where the full integrity protection on all UP traffic may not be possible. Under this condition, the RAN node 500 uses either full or partial integrity protection depending on factors such as the actual traffic rate at the time of transmission or reception, etc. Condition 3 indicates the data rate is above the threshold where the UE 300 is no longer requested to perform full integrity protection on all UP traffic.

In one example, there can be only one threshold or multiple thresholds being indicated by the RAN node 500 (2 thresholds shown in the example in Table 3).

Threshold A and threshold B in this indication can be determined by the RAN node 500 or pre-configured in the UE 300 and the RAN node 500.

The RAN node 500 indicates this rule to the UE 300 so that the UE 300 becomes aware of the integrity protection scheme to be used based on the defined thresholds.

Figure 4:
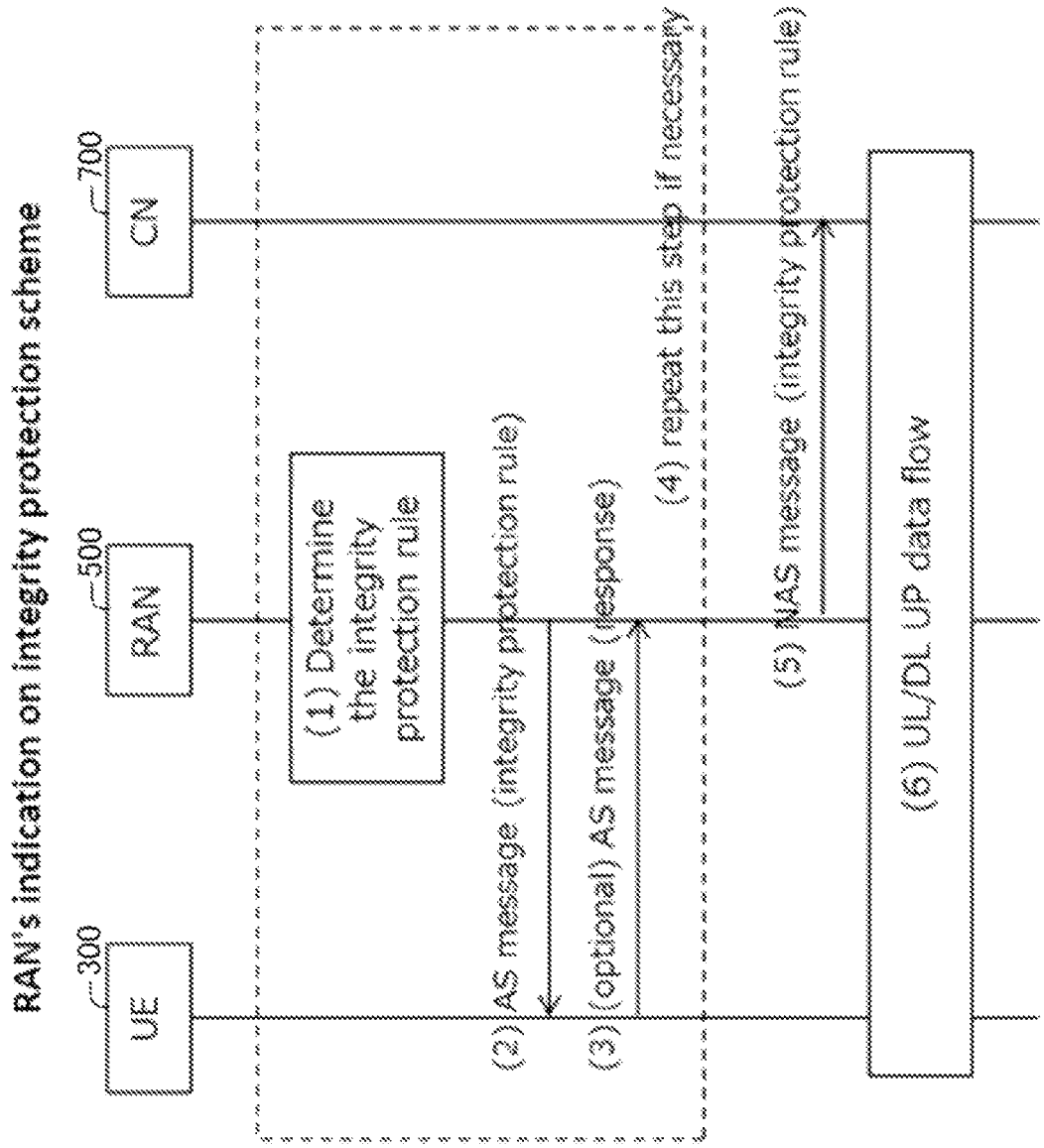
FIG. 4 illustrates several possible procedures for the RAN node to indicate its rule to the UE.

FIG. 4 illustrates several possible procedures for the RAN node 500 to indicate its rule (or preference) to the UE 300.

The steps are described as follows:
1. The RAN node 500 determines the integrity protection rule.
2. The RAN node 500 informs the rule to the UE 300, by sending AS message including the integrity protection rule, for example.
3. (optional) the UE 300 responds to the RAN node 500 to indicate whether it agrees with the rule or not by sending AS message, for example. In one example, no response indicates that UE 300 agrees with the provided rule.
4. (optional) if necessary, the steps 1 through 3 are repeated by the RAN node 500 by adjusting the integrity protection rule until the UE 300 indicates its agreement.

5. (optional) the RAN node 500 informs to the CN 700 regarding the integrity protection rule with the UE 300.
6. The UE 300 and the RAN node 500 execute the UP traffic transfer using the integrity protection rule provided by the RAN node 500.

Advantages of this variant are summarized as follows:

The UE 300 can become aware of the integrity protection scheme the RAN node 500 expects from the UE 300 (UL UP traffic).

The UE 300 can become aware of the integrity protection scheme the RAN node 500 uses to the UE 300 (DL UP traffic).

This scheme is beneficial to determine the integrity protection scheme in the UE 300 for UL UP traffic.

Variant 3:

In this variant, the procedures described in variants 1 and 2 are combined so that both the UE 300 and the RAN node 500 exchange capability and rule (and preference) to negotiate and reach agreement between them with respect to the integrity protection rule to be used between the UE 300 and the RAN node 500.

Figure 5:
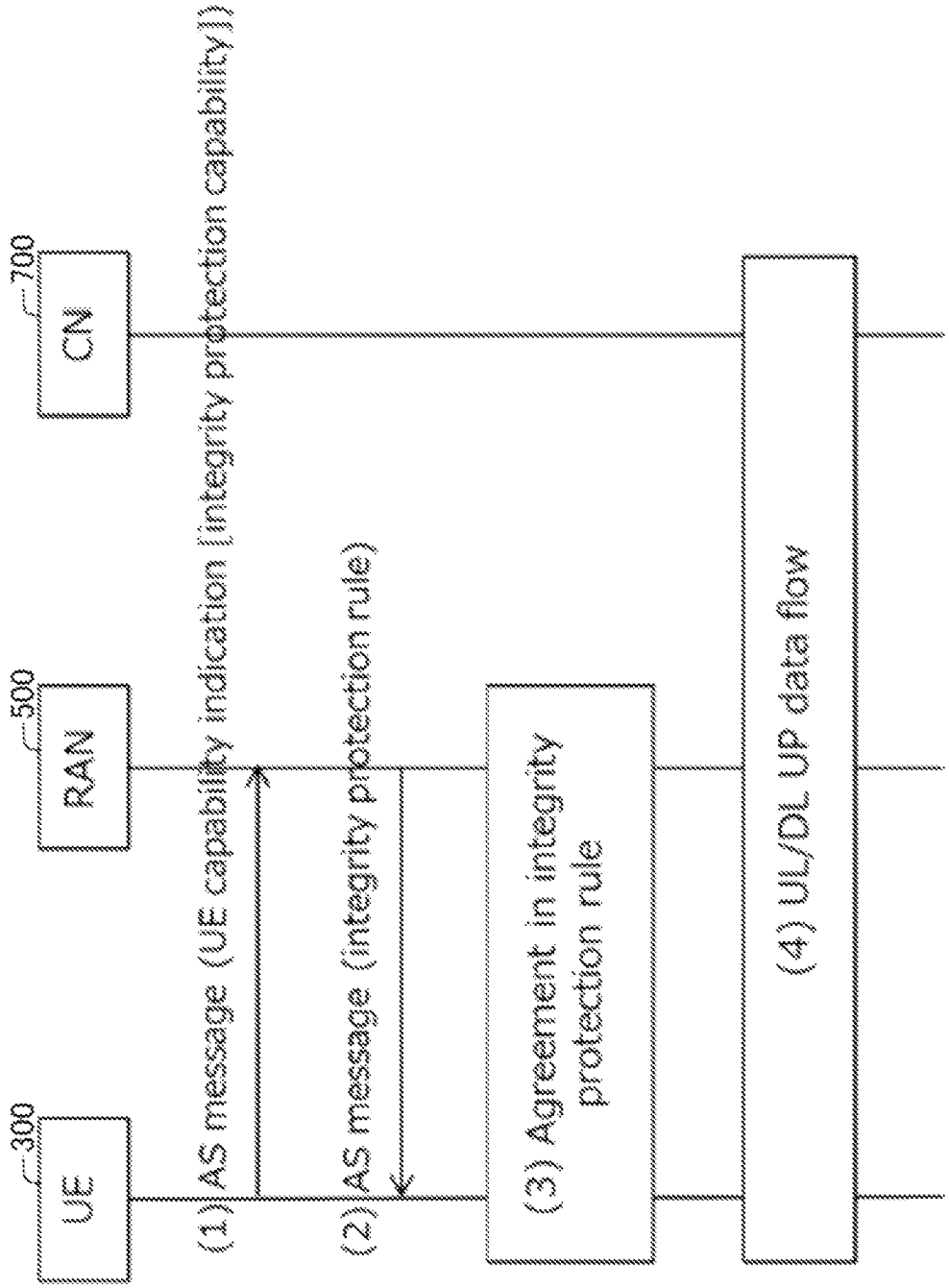
FIG. 5 shows an example of RAN's indication on integrity protection scheme.

FIG. 5 illustrates this procedure.

The steps are described as follows:
1. The UE 300 sends its capability of the integrity protection for the UP traffic.
2. The RAN node 500 indicates its rule (or preference) for the integrity protection for the UP traffic.
3. Based on the information exchanged in step 1 and 2, both sides reach agreement in the rule for the integrity protection.
4. The UE 300 and the RAN node 500 execute the UP traffic transfer using the integrity protection rule established in step 3.

Advantages of this variant are summarized as follows:

Both the UE 300 and the RAN node 500 can reach the informed decision to establish the rule for integrity protection for the UP traffic.

Variant 4:

In this variant, the CN 700 indicates the rule (or preference) to the RAN node 500 for the integrity protection rule. The integrity protection rule consists of similar type of information as described in variant 1 in the preceding section. But instead of this information being sent by the UE 300, in this variant, the CN 700 provides the rule to the RAN node 500.

In this example, the integrity protection rule can be represented in Table 4.

TABLE 4

CN's rule (or preference) on integrity protection scheme

| Condition | CN's rule (or preference) |
|---|---|
| 1) metric value < threshold A | Full integrity protection |
| 2) Threshold A <= metric value < threshold B | Full integrity protection or Partial integrity protection |
| 3) Threshold B <= metric value | Partial integrity protection |

In Table 4, "threshold A" and "threshold B" indicate a certain condition for which the UE 300 is under. In one example, the threshold can indicate data rate, such as specific to DL traffic, specific to UL traffic, or both DL and UL traffic. In another example, these thresholds can represent some other metric other than data rate.

The following description is based on the data rate being used as the threshold.

Condition 1 indicates the data rate is below a certain threshold for which the RAN node 500 is requested to perform full integrity protection on all UP traffic between the UE 300 and the RAN node 500. Condition 2 indicates the data rate is in the "border line zone" where the full integrity protection on all UP traffic may not be possible. Under this condition, the CN 700 requests the RAN node 500 to use either full or partial integrity protection depending on factors such as the actual traffic rate at the time of transmission or reception, etc. Condition 3 indicates the data rate is above the threshold where the RAN node 500 is no longer requested to perform full integrity protection on all UP traffic between the UE 300 and the RAN node 500.

In one example, there can be only one threshold or multiple thresholds being indicated by the CN 700 (2 thresholds shown in the example in Table 4).

Threshold A and threshold B in this indication can be determined by the CN 700 or pre-configured in the CN 700.

The CN 700 indicates this rule to the RAN node 500 so that the RAN node 500 becomes aware of the integrity protection scheme to be used between the UE 300 and the RAN node 500 based on the defined thresholds.

Figure 6:
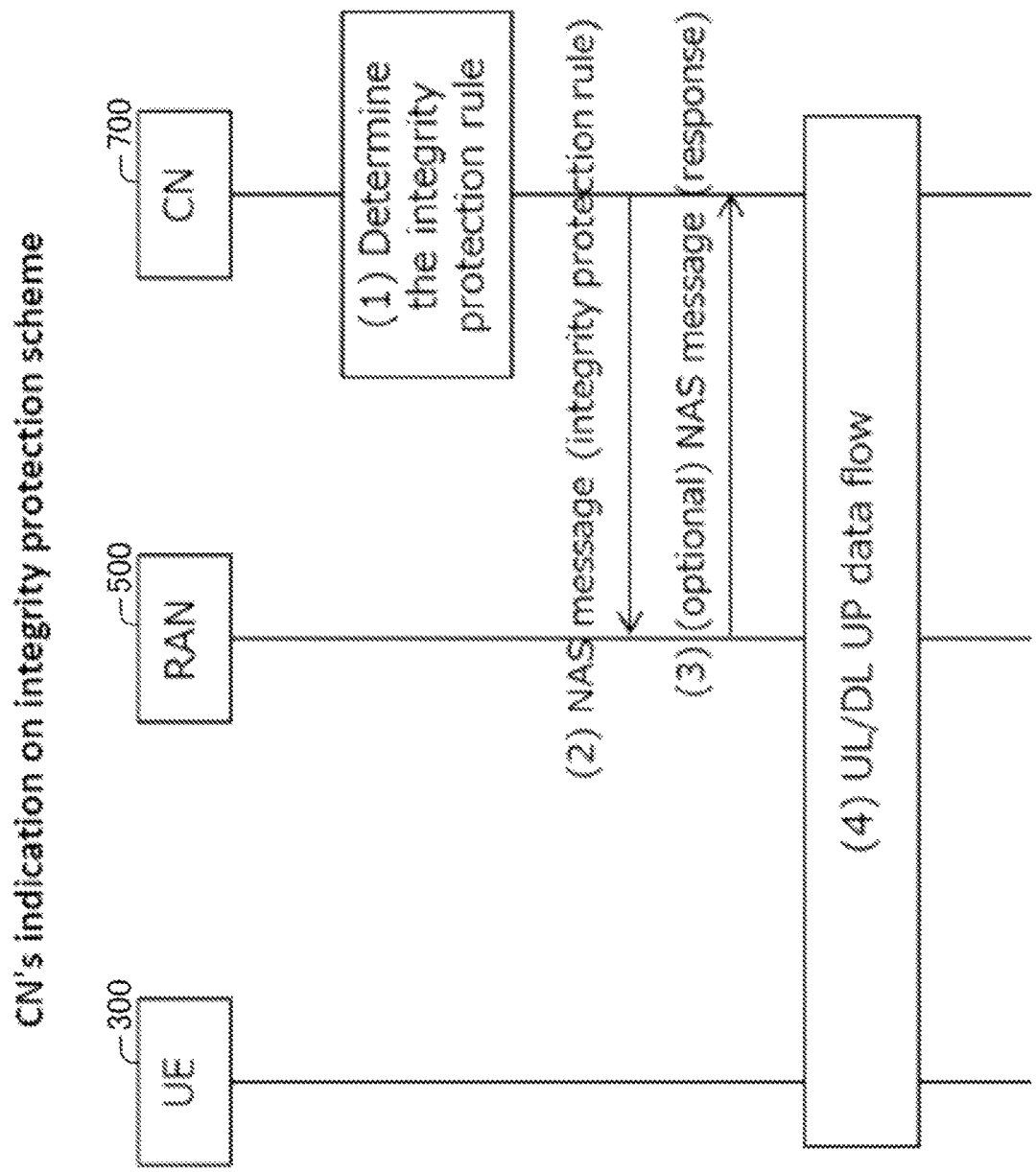
FIG. 6 illustrates the procedures for the CN to indicate its rule to the RAN node.

FIG. 6 illustrates the procedures for the CN 700 to indicate its rule (or preference) to the RAN node 500.

The steps are described as follows:
1. The CN 700 determines the integrity protection rule.
2. The CN 700 informs the rule to the RAN node 500.
3. (optional) the UE 300 responds to the RAN node 500 to indicate that the RAN node 500 has accepted the rule from the CN 700. In one example, no response indicates that RAN node 500 agrees with the provided rule.
4. The UE 300 and the RAN node 500 execute the UP traffic transfer using the integrity protection rule provided by the CN 700.

Advantages of this variant are summarized as follows:

The CN 700 can set the rule of the integrity protection scheme the RAN node 500 to use in the UP traffic flow between the UE 300 and the RAN node 500.

The RAN node 500 can become aware of the integrity protection scheme the CN 700 expects to use between the UE 300 and the RAN node 500.

Variant 5:

In this variant, the previously described variants are combined to establish end-to-end integrity protection rule to be used between the UE 300 and the RAN node 500.

In one example, the CN 700 first notifies the rule (or preference) to the RAN node 500. Then based on the rule provided by the CN 700, the RAN node 500 and the UE 300 establish the integrity protection rule for the UP traffic.

In one example, the integrity protection rule provided by the CN 700 to the RAN node 500 is considered as a guideline for the RAN node 500 to take into account upon negotiating the rule between the UE 300 and the RAN node 500. In another example, the integrity protection rule provided by the CN 700 to the RAN node 500 is considered as a mandatory rule for the RAN node 500 and the UE 300 to use; in this case, the negotiation step between the UE 300 and the RAN node 500 is skipped. In this sense, the negotiation step between the UE 300 and the RAN node 500 is optional.

Figure 7:
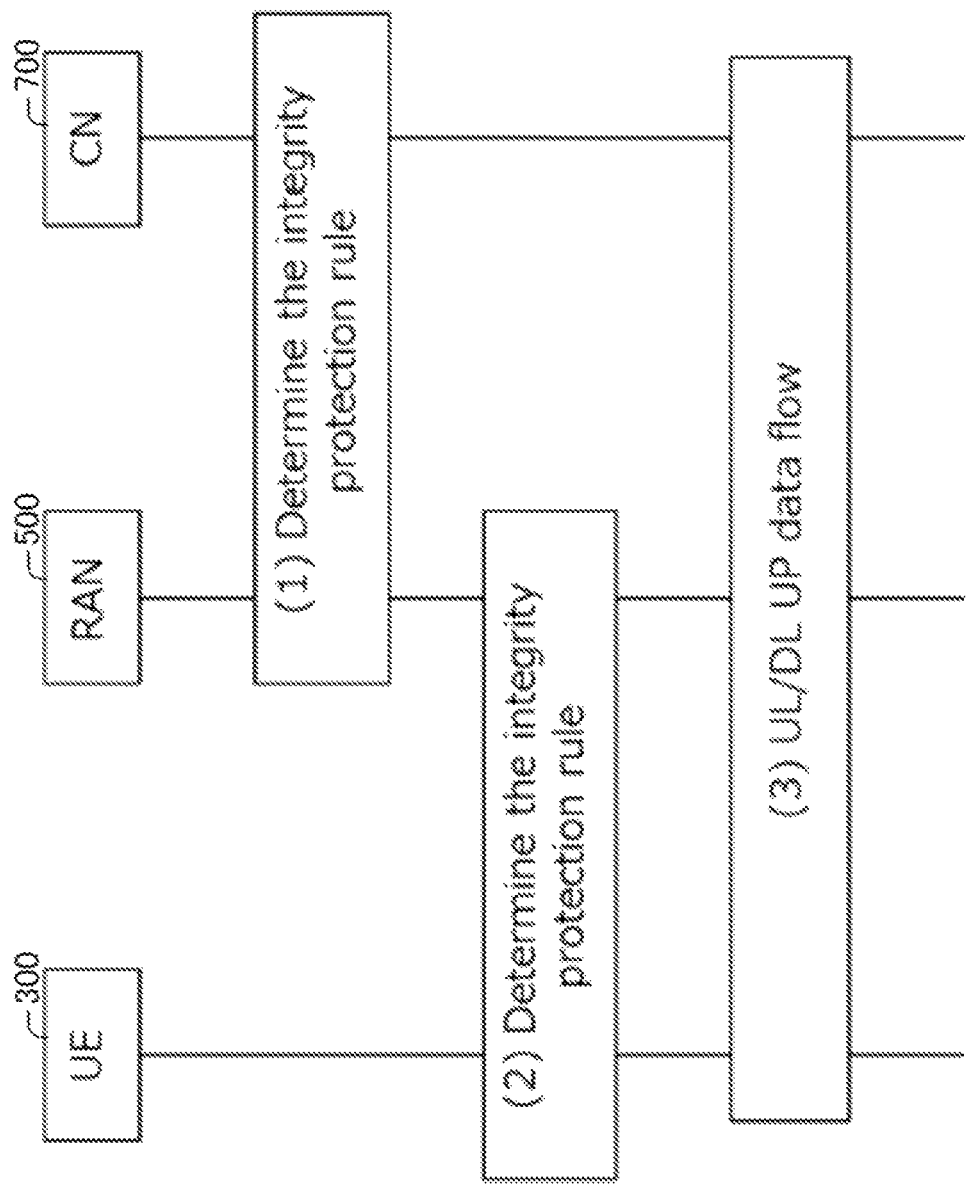
FIG. 7 illustrates the procedures for the end-to-end integrity protection rule.

FIG. 7 illustrates the procedures for the end-to-end integrity protection rule.

The steps are described as follows:
1. The CN 700 and the RAN node 500 establish the integrity protection rule to be used between the UE 300 and the RAN node 500. This is based on variant 4 described in the earlier section.

2. (optional) based on the rule established in step 1 above, the UE 300 and the RAN node 500 establish the integrity protection rule to be used between the UE 300 and the RAN node 500. This is based on either variant 3 described in the earlier section. This step is skipped if the rule provided by the CN 700 in step 1 is indicated as a mandatory for the RAN node 500 to follow.

3. The UE 300 and the RAN node 500 execute the UP traffic transfer using the integrity protection rule established in step 1 and 2.

Advantages of this variant are summarized as follows:

All entities including the UE 300, the RAN node 500, and the CN 700 establish the integrity protection rule based on information exchanged and negotiation between them.

The CN 700 can instruct the RAN node 500 with either 1) the mandatory rule or 2) guideline for the integrity protection to be applied for the RAN node 500 to use.

Third Embodiment—Dynamically Controlling the Integrity Protection Mechanism Based on the Measured Value Against the Threshold This embodiment describes the mechanism in which the transmitter side determines the integrity protection scheme to be used based on a given condition.

The transmitting side refers to either the UE 300 or the RAN node 500 depending on the direction of the UP traffic—the UE 300 for the UL traffic, and the RAN node 500 for DL traffic.

The following description is based on the data rate being used as the threshold. However, other criteria are not excluded.

Figure 8:
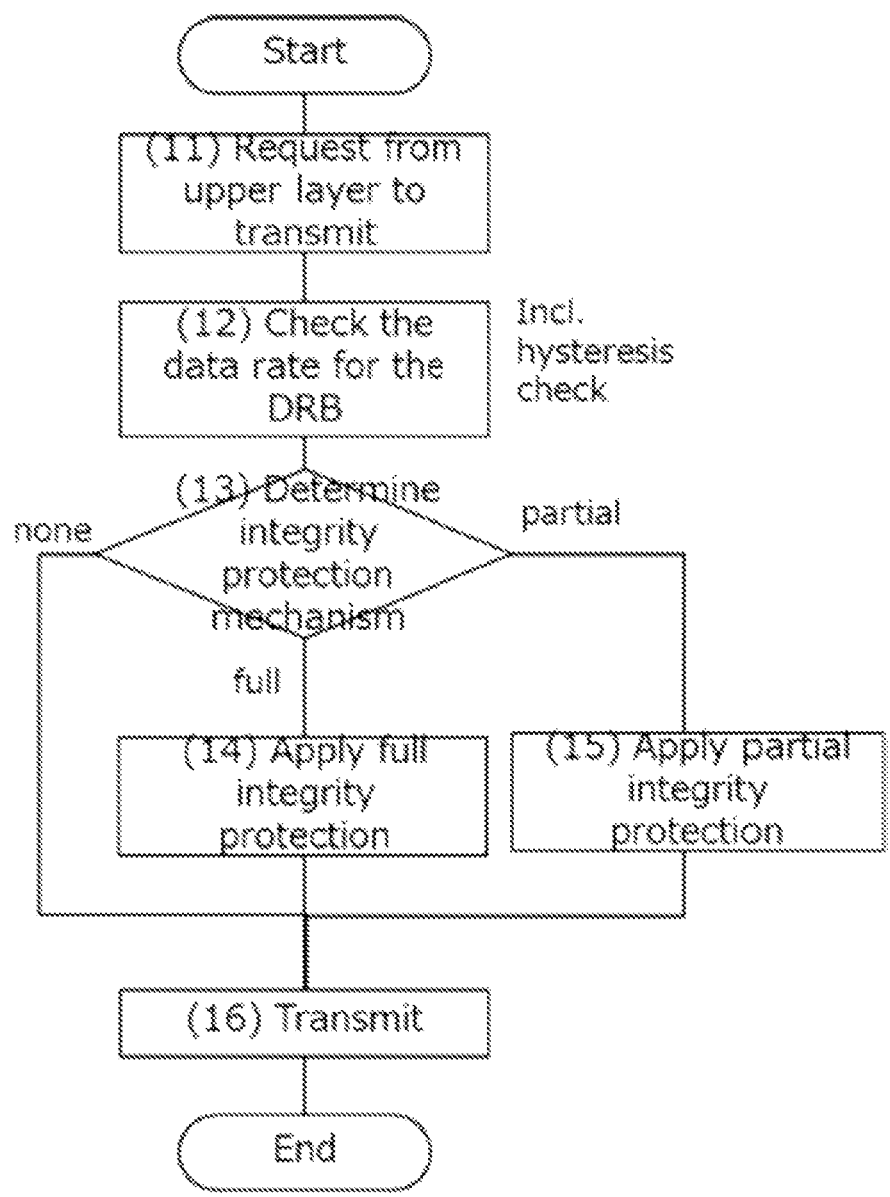
FIG. 8 describes the procedure in the transmitting side.

FIG. 8 describes the procedure in the transmitting side.

When traffic to be sent is passed from the upper layer in the transmitting side (Step 11), the transmitter side checks the ongoing data rate for the DRB for the UE 300 (Step 12). Based on the measured data rate, the transmitter determines which integrity protection scheme (full or partial) or no protection is applied to the outgoing traffic (step 13). Depending on this selection, the transmitter applies the selected integrity protection scheme to the outgoing traffic (Step 14 or Step 15) and transmits it to the receiving side (Step 16).

In one example, the transmitter side periodically or continuously monitors the data rate. This information collected over a period of time gives indication of the trend in the dynamic change in the data rate. This monitored data can be saved for a certain period and used for analysis of the traffic trend. Older ones may be replaced by the newly collected data. This information further can be used as a basis to determine the hysteresis upon determining whether a threshold is crossed or not. Use of hysteresis reduces the potential frequent changes in the use of integrity protection or change between the period of integrity protection and the period without integrity protection.

In one example, the transmitter side monitors more than one DRB for a given UE 300. In case a UE 300 has multiple DRBs being used simultaneously, the aggregate data rate for all DRBs may be used to determine the threshold where the integrity protection scheme is changed, turned on or off.

In one example, if the data rate crosses the threshold that was established in the rule using any of the mechanism variants described in suction 2.2, the transmitter side adjusts the integrity protection scheme to match the corresponding criteria in the rule. In other words, if the data rate crosses the determined threshold as defined in the established rule being used, then the transmitter may apply different integrity protection to the UP traffic. For example, depending on the established rule, if the data rate goes above the threshold, then the integrity protection may change from full to partial. Likewise, if the data rate goes down below the threshold, then the integrity protection may change from partial to full. This is depending on the established rule and threshold value.

In one example, information on which type of integrity protection is applied in a given packet can be indicated at the PDCP PDU level. In particular, one or more reserve bit in the PDCP header can be used to indicate whether the PDCP PDU contains whether full or partial integrity protection is used in the PDU. Using this information, receiving side knows which integrity protection scheme (or no integrity protection) is used in the PDCP PDU.

Figure 9:
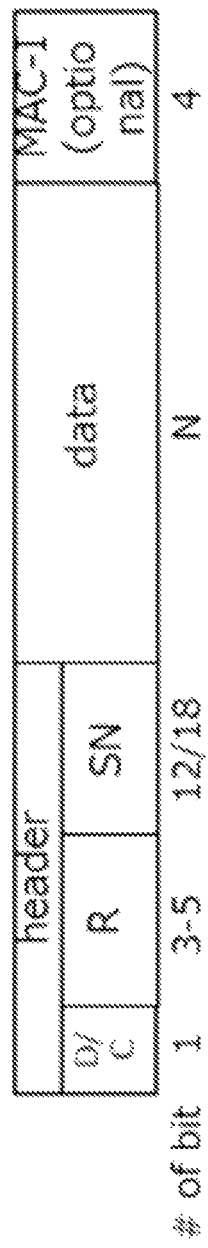
FIG. 9 illustrates one example of the use of reserved bits.

One example of the use of reserved bits is shown in FIG. 9. Other definitions to convey the same information are possible and are not excluded.

Figure 10:
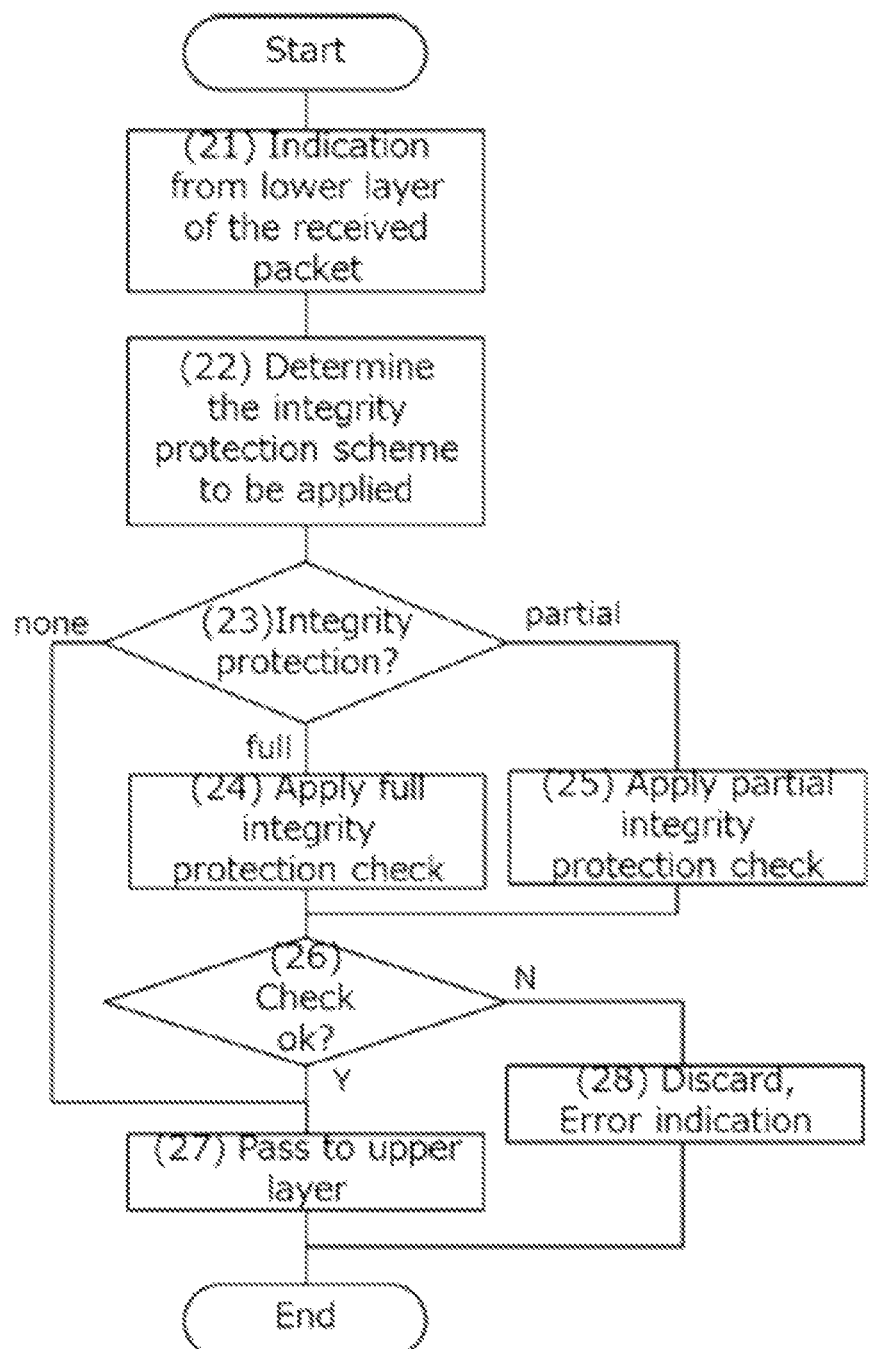
FIG. 10 describes the procedure in the receiving side.

FIG. 10 describes the procedure in the receiving side.

In one example, the lower layer indicates the arrival of incoming packet (Step 21). The receiving side determines the type of integrity protection used in the received PDCP PDU based on the indication as described above in FIG. 9 as an example (Step 22). The receiver check if integrity protection is applied to the received PDU or not, and if so, whether it is a full integrity protection or partial integrity protection (Step 23). Depending on the checking in Step 23, the receiver verifies the integrity of the received PDU using either full integrity protection (Step 24) or partial integrity protection (Step 25). The receiver checks if the integrity check is successful or not (Step 26). If it is successful, then the received PDU is passed to the upper layer for further processing (Step 27). If it is a failure, then the received PDU is discarded, and optionally, an error indication is sent to the transmitter side (Step 28).

The receiving side refers to either the UE 300 or the RAN node 500 depending on the direction of the UP traffic—the UE 300 for the DL traffic, and the RAN node 500 for UL traffic.

In one example, the receiver side determines the type of integrity protection used in the received PDCP PDU based on the information indicated in the PDCP header as described in FIG. 9.

In another example, the receiver side determines the type of integrity protection used in the received PDCP PDU based on its own measurement of the ongoing data rate.

Fourth Embodiment—Method in Mobility, Handover and Interworking Between Different Systems In various intra-system and inter-system mobility scenarios involving multiple systems such as 5GS and EPS, capabilities and usage of the UE's integrity protection mechanisms described in this disclosure are verified by the network nodes such as eNB, MME, gNB and AMF in the source or the target system before deciding to accept or reject the mobility request, e.g., handover request or TAU update request. The relevant mobility scenarios include interworking between different systems, e.g., between EPS and 5GS in either direction. If the integrity protection capabilities or the mechanism used by the UE 300 are not supported by the target nodes in the target system, the handover or TAU procedure in the target system is either rejected or accepted with changes in UE's integrity protection mechanisms to conform to the supported integrity protection functionalities in the target system.

The UE's integrity protection capabilities or mechanisms that are verified in these inter-system mobility scenarios include the value or range of the parameters or conditions used for the integrity protection schemes described in this disclosure. For the scenario of interworking between EPS and 5GS systems, mapping of the security capabilities is necessary in order to maintain the same integrity protection mechanism being used for the UE 300, or to derive the alternate integrity protection mechanism for the UE 300 in the target system. If the functionalities in this disclosure are supported in the 5GS system but not in EPS system, then the mapped capabilities to the EPS system is applied to determine whether integrity protection is used for the UE 300 or not as the UE 300 moves to the target system.

Further, as per the relevant 3GPP specification, use of integrity protection for UP data traffic is not used in EPS system and is optional in 5GS system. However it may be used for security reasons. If integrity protection for UP data is required but it's not used or not supported in the target system, then the UE's mobility to the target system is either rejected or the integrity protection mechanism is changed to allow the UE's mobility to the target system.

In one example, mobility to the target system is allowed if the UE 300 accepts the change in integrity protection mechanism supported in the target system. The decision in the UE 300 is determined by factors such as the type of service or services the UE 300 is using at the time of the mobility event and their sensitivity of the information or type of communication.

For example, different type of services is characterized by different level of sensitivity in such a way that integrity protection may or may not be needed. If the UE 300 is using the type of services which does not strictly require the use of integrity protection or reduction or loss of integrity protection is tolerable to the UE 300, then the mobility to the target system is allowed.

In another example, the mobility to the target system is denied if the UE 300 does not accept, or not able to cope with, the change in the integrity protection mechanism supported in the target system as the result of the mobility event. One scenario is where, as the result of the mobility even to the target system, the UE 300 has to incur either loss or reduction in the level of integrity protection for the type of service it uses.

General Description of the Embodiments

The general description of the disclosure is described below.

Figure 11:
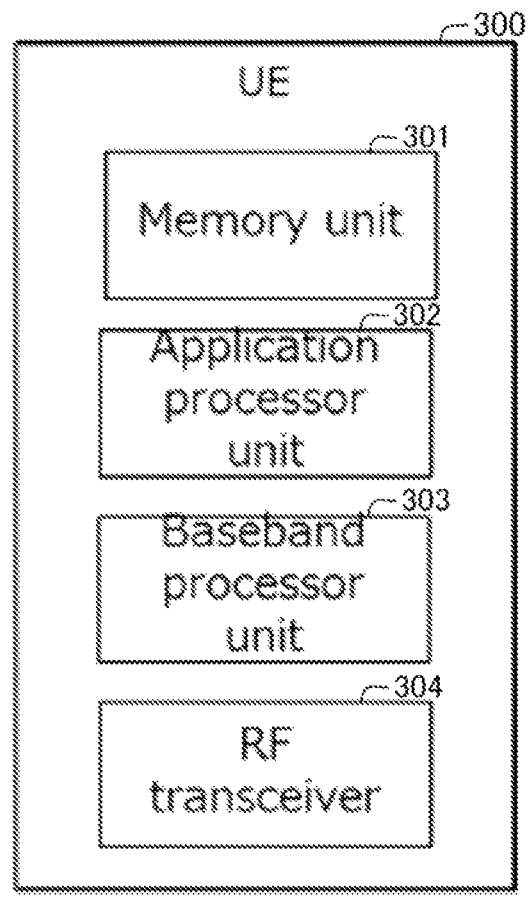
FIG. 11 shows the general components of the User Equipment.

FIG. 11 shows the general components of the User Equipment (UE 300). It consists of memory unit, application processor unit, baseband processor unit, and RF transceiver unit.

RF transceiver is configured to transmit packet in uplink or receive packet in downlink, and does the radio layer processing such as modulation, de-modulation, radio transmission, reception, etc.

Baseband processor unit is configured to handle physical layer processing such as configuration, allocation, management, and usage of radio resources, such as physical channels, logical channels, and transport channels.

Application processor unit is configured to process communication protocol stack, CP signaling, UP traffic handling, application layer message handling, configuration management, fault management, etc.

Memory unit is configured to store information for the UE 300.

Figure 12:
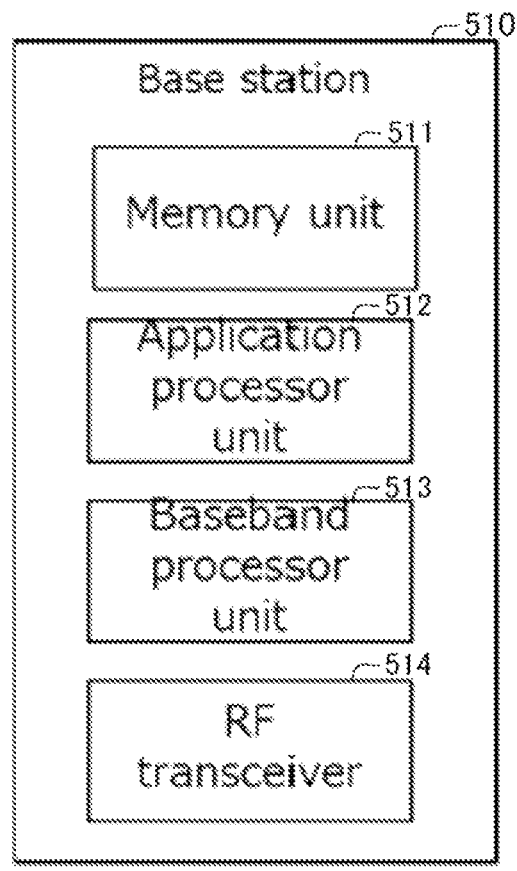
FIG. 12 shows the general components of the base station.

FIG. 12 shows the general components of the base station. Base station is a generic terminology to refer to the RAN infrastructure and has specific terminology for different generation of mobile systems. For example, it is called gNB in 5G system and eNB in 4G (LTE) system. It consists of memory unit, application processor unit, baseband processor unit, and RF transceiver unit.

Figure 13:
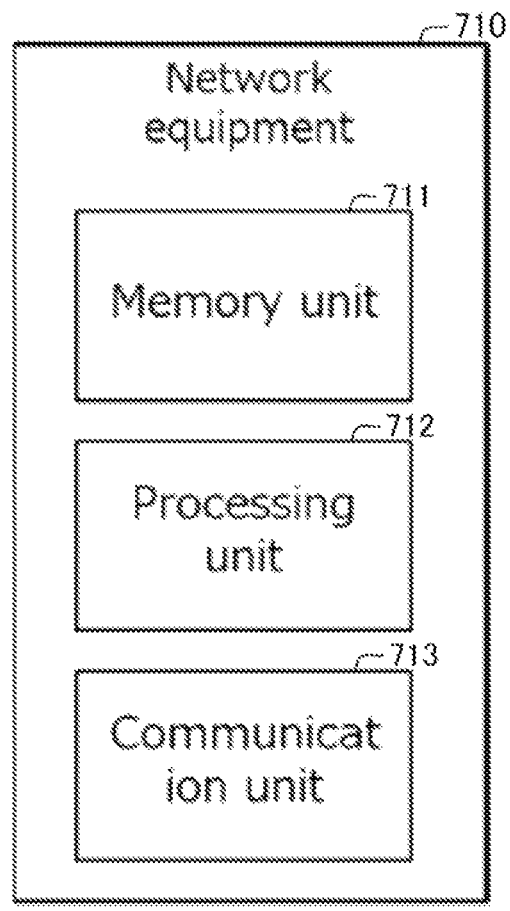
FIG. 13 shows the general components of the network element.

FIG. 13 shows the general components of the network element, such as AMF in the 5G Core Network (CN 700). It consists of memory unit, processing unit, and communication unit.

The description in this disclosure is in the context of a 5G system. However, it is possible to apply the same methods to any other systems such as 4G (LTE/LTE-Advanced) systems and/or the like.

Beneficially, the above described exemplary embodiments include, although they are not limited to, one or more of the following functionalities:

First Embodiment

1) The RAN node/CN can determine the maximum data rate for which the UE can perform full integrity protection for the UP traffic.
2) No explicit capability indication from the UE is necessary.
3) Can handle all 3GPP release UEs (irrespective of whether or not the UE supports capability indication of the maximum data rate support for full integrity protection).

Second Embodiment

1) The UE and RAN node can determine the integrity protection rule for UP traffic based on one or more information: 1) UE indication, 2) RAN node indication, 3) CN node indication, 4) combination of multiple indications.
2) The RAN node can determine the integrity protection rule based on the UE's capability.
3) The RAN node can instruct the integrity protection rule to the UE based on either: 1) RAN node's own rule (or preference) or CN's rule (or preference).
4) The UE and the RAN node can negotiate and agree on the integrity protection rule by exchanging capability and rule (or preference).
5) The CN can instruct the integrity protection rule to the RAN node based on its own rule (or preference).
6) The UE, the RAN node, and the CN can collectively negotiate and agree on the integrity protection rule by exchanging capability and rule (or preference).

Third Embodiment

1) The transmitting side (either the RAN node for DL or the UE for UL) can dynamically determine the type of integrity protection scheme to be used in the PDCP PDU based on the determined criteria.
2) The transmitter side (either the RAN node for DL or the UE for UL) can change the integrity protection scheme dynamically based on the rule and threshold.
3) The transmitting side (either the RAN node for DL or the UE for UL) can indicate the type of integrity protection used in the PDCP PDU.

4) The receiving side can apply the correct integrity protection check to the received PDCP PDU.

The above embodiments describe exemplary methods comprising (at least some of) the steps of:

First Embodiment

1) The CN transmit DL UP traffic to the UE with full integrity protection.
2) The UE responds to the RAN node or CN if the UE is not able to process full integrity protection to all received DL UP traffic.
3) The RAN node or the CN adjusts the DL UP traffic data rate.
4) The UE determines it can process full integrity protection to all received DL UP traffic.
5) The RAN node or the CN stores the data rate for which the UE is able to process full integrity protection to all received DL UP traffic.

Second Embodiment

Variant 1:
1) The UE indicates it integrity protection capability or rule (or preference) to the RAN node or CN.
2) The RAN node or the CN uses the received capability information to determine the threshold to determine the integrity protection rule.

Variant 2:
1) The RAN node indicates its integrity protection rule (or preference) to the UE.
2) The UE uses the received rule (or preference) upon transmitting or receiving the UP traffic.

Variant 3:
1) The UE and the RAN node exchange the integrity protection capability or rule with each other.
2) The UE and the RAN node agrees on the integrity protection rule to be used.

Variant 4:
1) The CN indicates its integrity protection rule (or preference) to the RAN node.
2) The RAN node uses the received rule (or preference) upon transmitting or receiving the UP traffic to the UE.

Variant 5:
1) The CN and the RAN node determine the integrity protection rule.
2) The RAN node and UE determine the integrity protection rule.
3) The UE, RAN node, and the CN transmits or receives the UP traffic.

Third Embodiment

1) The transmitter side (either UE or the RAN node depending on the traffic direction) determines which integrity protection scheme to be used or no integrity protection at all, upon transmitting the UP traffic based on the rule.
2) The transmitter side indicates the type of integrity protection used or not integrity protection at all in the PDCP header.
3) The receive side applies the appropriate integrity protection check to the received PDCP PDU.

Benefits

The RAN node or CN can determine the maximum data rate for which the UE can process full integrity protection without explicit indication from the UE itself based on the empirical information driven from the course or normal UP traffic handling.

The UE, the RAN node, and the CN can determine the integrity protection rule based on threshold values (e.g., data rate).

The transmitting side (either the RAN node for DL or the UE for UL) can dynamically determine or change the integrity protection used in the PDCP PDU based on a set of criteria (threshold).

The transmitting side (either the RAN node for DL or the UE for UL) can indicate the type of integrity protection used in the PDCP PDU.

System Overview

Figure 14:
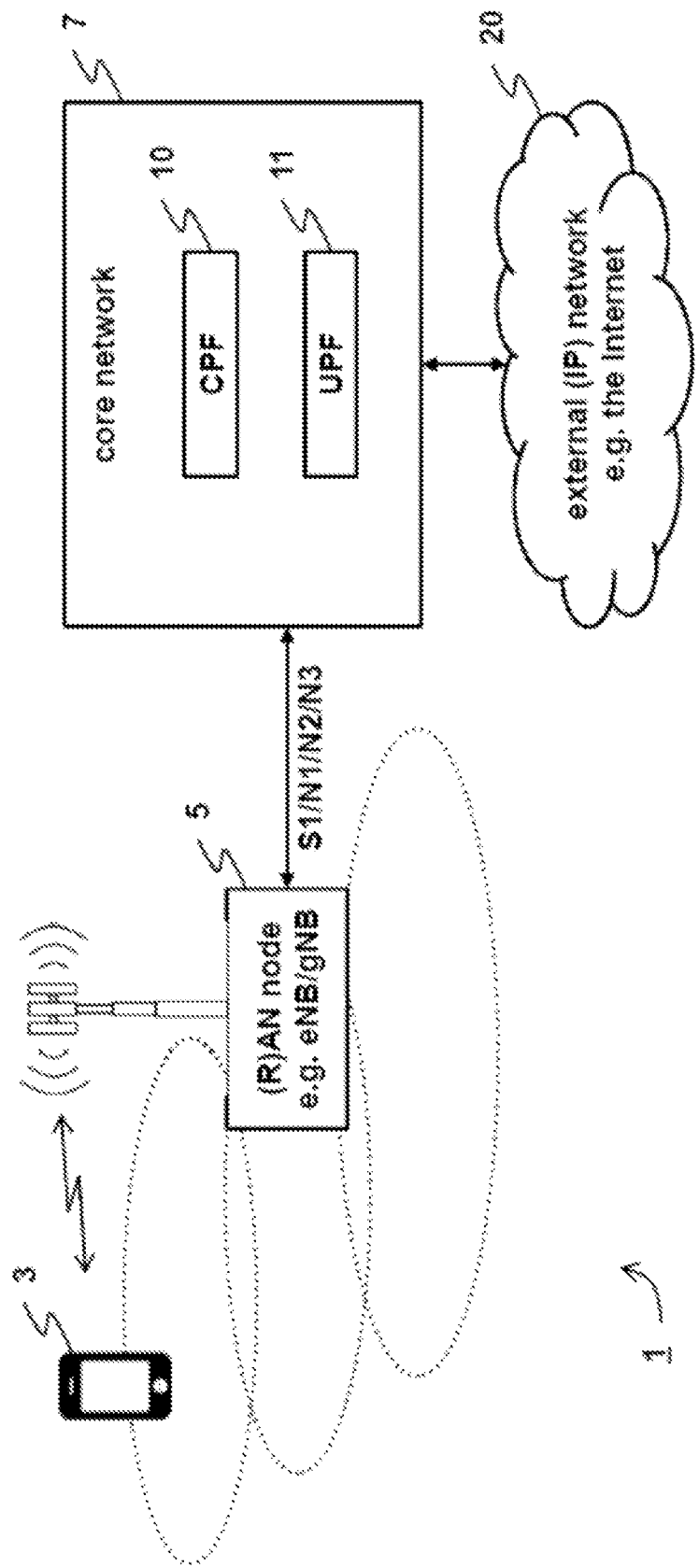
FIG. 14 schematically illustrates a mobile telecommunication system to which the above embodiments are applicable.

FIG. 14 schematically illustrates a mobile (cellular or wireless) telecommunication system 1 to which the above embodiments (and variants thereof) are applicable.

In this network, users of mobile devices 3 (UEs) can communicate with each other and other users via respective base stations 5 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst one mobile device 3 and one base station 5 are shown in FIG. 8 for illustration purposes, the system, when implemented, will typically include other base stations and mobile devices (UEs).

Each base station 5 controls one or more associated cells (either directly or via other nodes such as home base stations, relays, remote radio heads, distributed units, and/or the like). A base station 5 that supports E-UTRA/4G protocols may be referred to as an 'eNB' and a base station 5 that supports Next Generation/5G protocols may be referred to as a 'gNBs'. It will be appreciated that some base stations 5 may be configured to support both 4G and 5G, and/or any other 3GPP or non-3GPP communication protocols.

The mobile device 3 and its serving base station 5 are connected via an appropriate air interface (for example the so-called 'Uu' interface and/or the like). Neighbouring base stations 5 are connected to each other via an appropriate base station to base station interface (such as the so-called 'X2' interface, 'Xn' interface and/or the like). The base station 5 is also connected to the core network nodes via an appropriate interface (such as the so-called 'S1', 'N1', 'N2', 'N3' interface, and/or the like).

The core network 7 typically includes logical nodes (or 'functions') for supporting communication in the telecommunication system 1. Typically, for example, the core network 7 of a 'Next Generation'/5G system will include, amongst other functions, control plane functions (CPFs) 10 and user plane functions (UPFs) 11. From the core network 7, connection to an external IP network 20 (such as the Internet) is also provided.

The components of this system 1 are configured to perform the above described exemplary embodiments.

User Equipment (UE)

Figure 15:
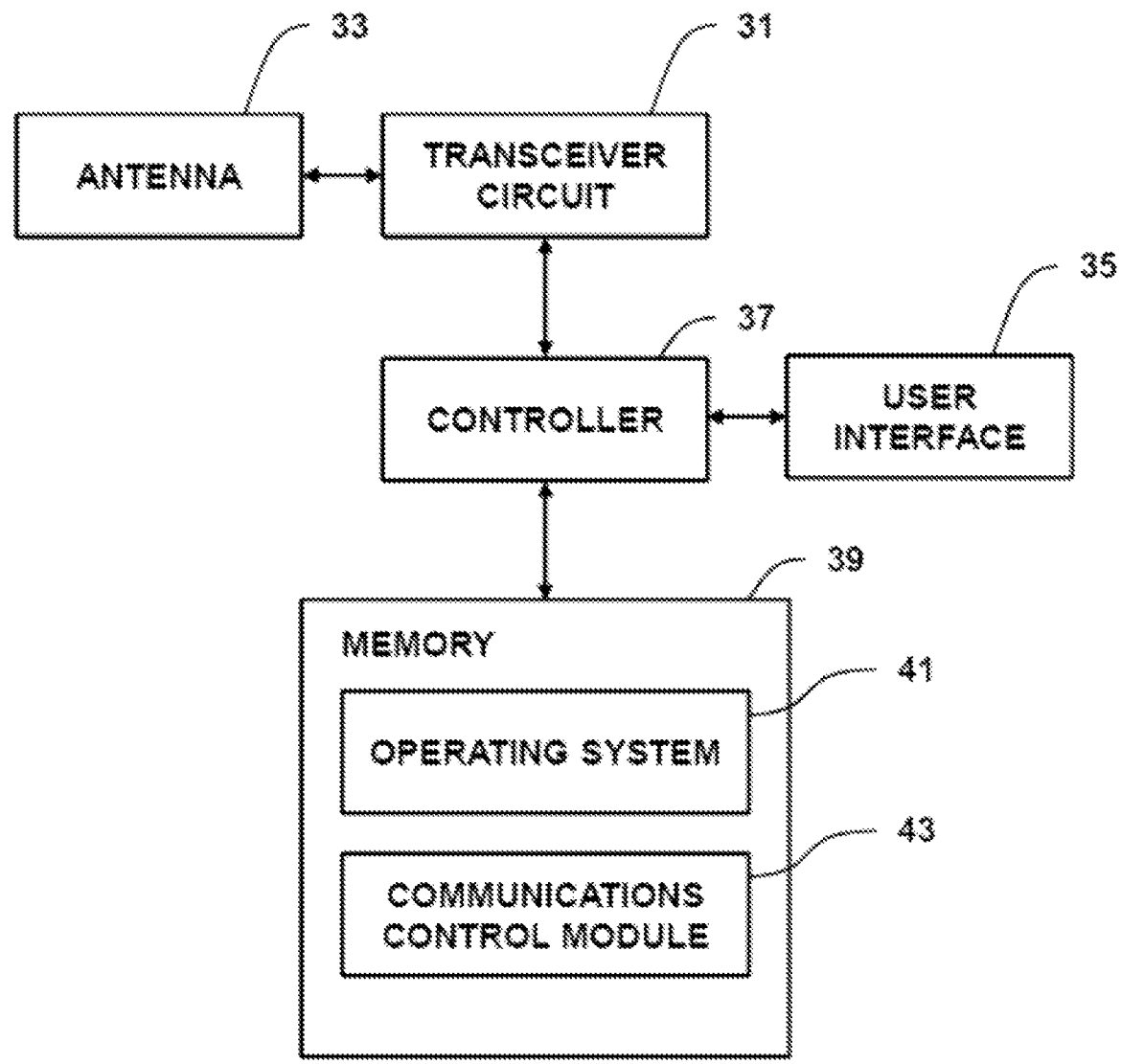
FIG. 15 is a block diagram illustrating, in more detail, the main components of the UE shown in FIGS. 11 and 14.

FIG. 15 is a block diagram illustrating, in more detail, the main components of the UE (mobile device 3) shown in FIGS. 11 and 14. As shown, the UE 3 includes a transceiver circuit 31 which is operable to transmit signals to and to receive signals from the connected node(s) via one or more antenna 33. Although not necessarily shown, the UE will of course have all the usual functionality of a conventional mobile device (such as a user interface 35) and this may be provided by any one or any combination of hardware, software and firmware, as appropriate. A controller 37 controls the operation of the UE in accordance with software stored in a memory 39. The software may be pre-installed in the memory 39 and/or may be downloaded via the telecommunication network 1 or from a removable data storage device (RMD), for example. The software includes, among other things, an operating system 41 and a communications control module 43. The communications control module 43 is responsible for handling (generating/sending/receiving) signalling messages and uplink/downlink data packets between the UE 3 and other nodes, including (R)AN nodes 5 and core network nodes.

(R)AN Node

Figure 16:
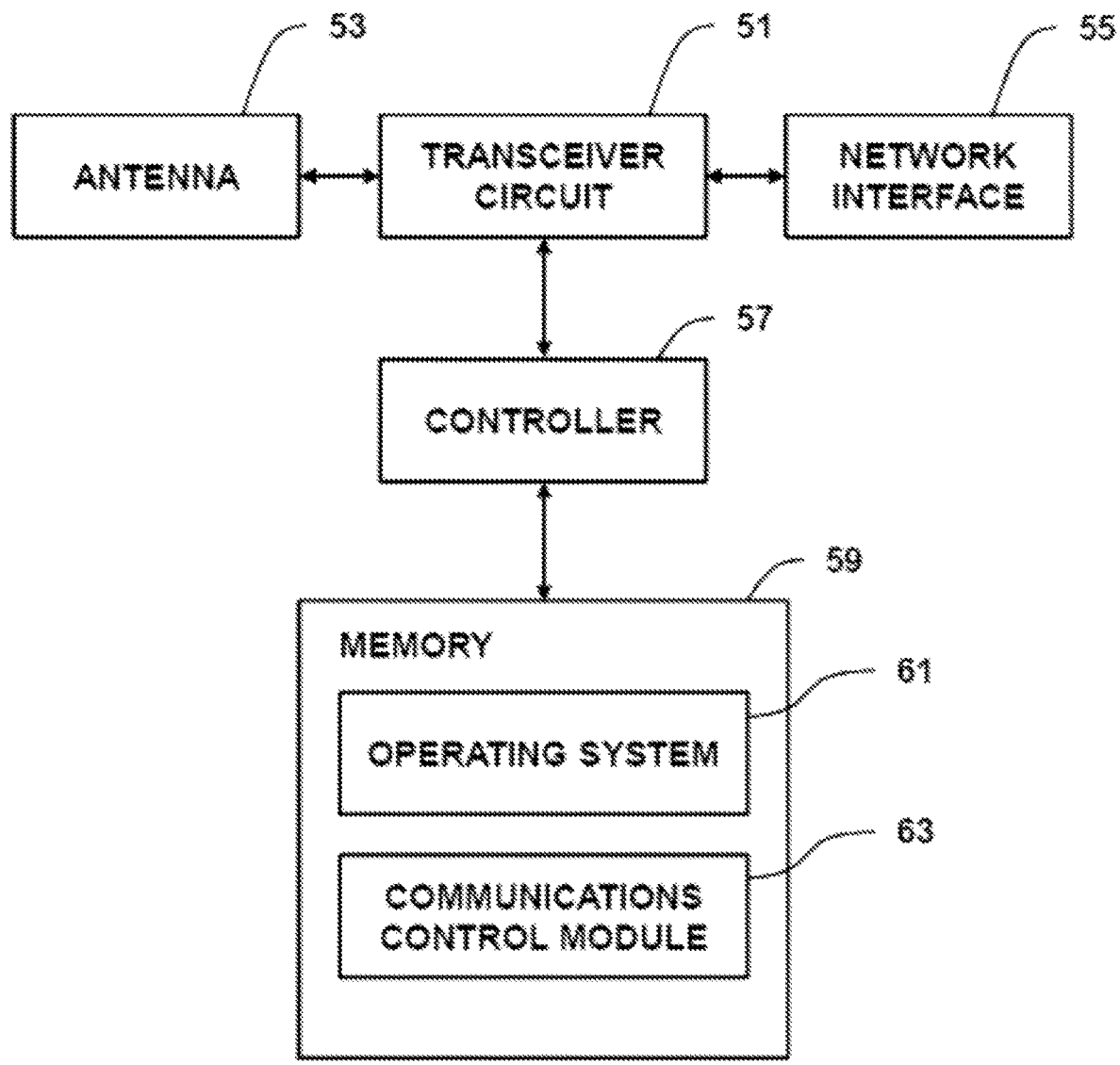
FIG. 16 is a block diagram illustrating, in more detail, the main components of an exemplary (R)AN node shown in FIGS. 12 and 14.

FIG. 16 is a block diagram illustrating, in more detail, the main components of an exemplary (R)AN node 5 (base station) shown in FIGS. 12 and 14. As shown, the (R)AN node 5 includes a transceiver circuit 51 which is operable to transmit signals to and to receive signals from connected UE(s) 3 via one or more antenna 53 and to transmit signals to and to receive signals from other network nodes (either directly or indirectly) via a network interface 55. The network interface 55 typically includes an appropriate base station—base station interface (such as X2/Xn) and an appropriate base station—core network interface (such as S1/N1/N2/N3). A controller 57 controls the operation of the (R)AN node 5 in accordance with software stored in a memory 59. The software may be pre-installed in the memory 59 and/or may be downloaded via the telecommunication network 1 or from a removable data storage device (RMD), for example. The software includes, among other things, an operating system 61 and a communications control module 63. The communications control module 63 is responsible for handling (generating/sending/receiving) signalling between the (R)AN node 5 and other nodes, such as the UE 3 and the core network nodes/network elements.

Core Network Bode

Figure 17:
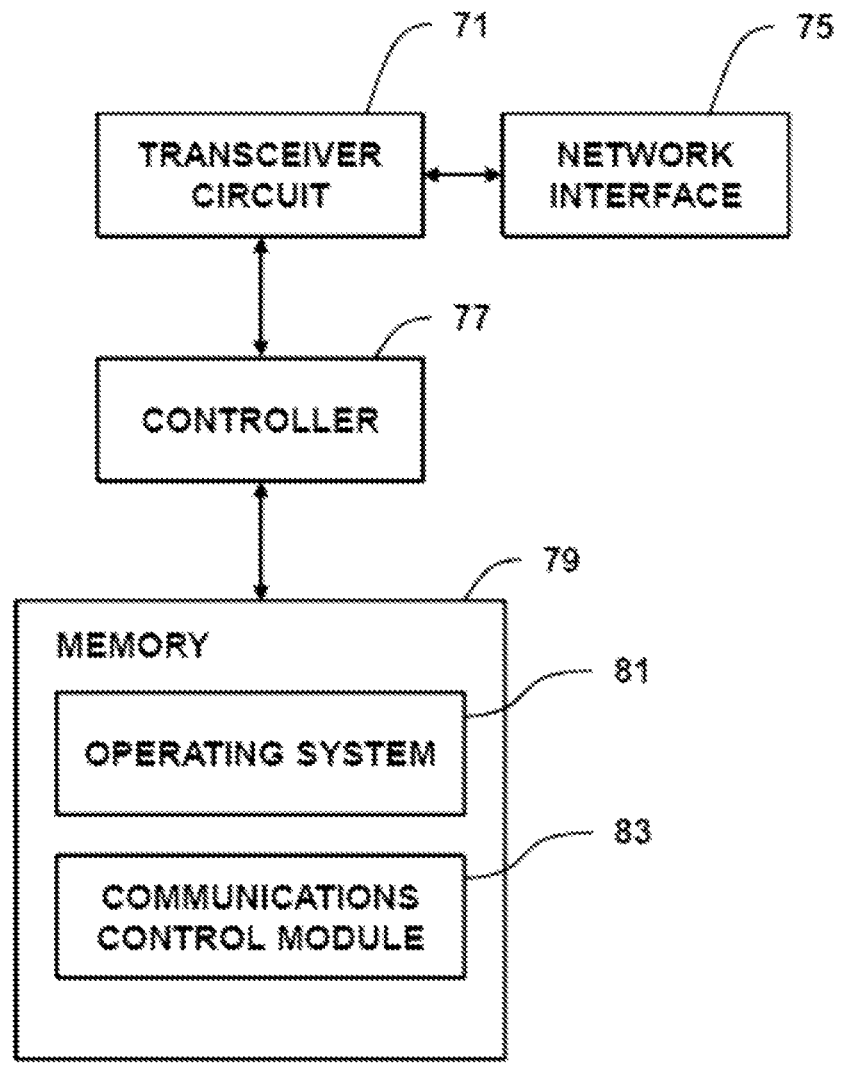
FIG. 17 is a block diagram illustrating, in more detail, the main components of a generic core network node shown in FIGS. 13 and 14.

FIG. 17 is a block diagram illustrating, in more detail, the main components of a generic core network node (network element or function) shown in FIGS. 13 and 14. As shown, the core network node includes a transceiver circuit 71 which is operable to transmit signals to and to receive signals from other nodes (including the UE 3 and the (R)AN node 5) via a network interface 75. A controller 77 controls the operation of the core network node in accordance with software stored in a memory 79. The software may be pre-installed in the memory 79 and/or may be downloaded via the telecommunication network 1 or from a removable data storage device (RMD), for example. The software includes, among other things, an operating system 81 and at least a communications control module 83. The communications control module 83 is responsible for handling (generating/sending/receiving) signaling between the core network node and other nodes, such as the UE 3, (R)AN node 5, and other core network nodes. Such signaling includes appropriately formatted requests and responses (PDUs) in accordance with one of the above described embodiments.

Modifications and Alternatives

Detailed embodiments have been described above. As those skilled in the art will appreciate, a number of modifications and alternatives can be made to the above embodiments whilst still benefiting from the disclosures embodied therein. By way of illustration only a number of these alternatives and modifications will now be described.

In the above description, the UE, the (R)AN node, and the core network node are described for ease of understanding as having a number of discrete modules (such as the communication control modules). Whilst these modules may be provided in this way for certain applications, for example where an existing system has been modified to implement the disclosure, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

In the above embodiments, a number of software modules were described. As those skilled in the art will appreciate, the software modules may be provided in compiled or un-compiled form and may be supplied to the UE, the (R)AN node, and the core network node as a signal over a computer network, or on a recording medium. Further, the functionality performed by part or all of this software may be performed using one or more dedicated hardware circuits. However, the use of software modules is preferred as it facilitates the updating of the UE, the (R)AN node, and the core network node in order to update their functionalities.

The above embodiments are also applicable to 'non-mobile' or generally stationary user equipment.

Various other modifications will be apparent to those skilled in the art and will not be described in further detail here.

CITATION LIST

Non Patent Literature

[NPL 1] NEC-Japan invention disclosure, "Integrity protection for user plane data in 5G network" (filing #5050000034), February 2018
[NPL 2] NEC-Japan invention disclosure, "Efficient integrity protection", filing #5050000050, September 2018
[NPL 3] Lenovo, Motorola Mobility, S3-182942, "Achieving higher data rates for UP IP", 3GPP SA3 #92bis, September 2018
[NPL 4] 3GPP RAN2, S3-181650 (R2-1804056), "UE capability related to integrity protection of DRBs", 3GPP SA3 #91, May 2018
[NPL 5] 3GPP TS 23.501 V15.3.0, "System Architecture for the 5G System"
[NPL 6] 3GPP TS 23.502 V15.3.0, "Procedures for the 5G System"
[NPL 7] 3GPP TS 33.501 V15.2.0, "Security architecture and procedures for 5G System"
[NPL 8] 3GPP TS 38.323 V15.3.0, "Packet Data Convergence Protocol"

ABBREVIATIONS 2G 2nd Generation
3G 3rd Generation
3GPP 3rd Generation Partnership Project
4G 4th Generation
5G 5th Generation 5G CN 5G Core Network
AMF Access and Mobility management Function
AN Access Network
AS Access Stratum
CN Core Network
CP Control Plane
DL DownLink
DRB Data Radio Bearer
gNB Next-generation NodeB
LTE Long Term Evolution
MAC-I Message Authentication Code-Integrity
MD Message Digest
NAS Non-Access Stratum
NE Network Element
NG Next Generation (i.e., 5G)
PDCP Packet Data Convergence Protocol
PDU Protocol Data Unit
RAN Radio Access Network
RB Radio Bearer
SHA Security Hash Algorithm
SN Sequence Number
SRB Signaling Radio Bearer
TAU Tracking Area Update
TS Technical Specification
UE User Equipment
UL UpLink
UP User Plane Although the present disclosure has been described above with reference to some aspects, the present disclosure is not limited to the aspects. The configurations and details of the present disclosure can be changed in various manners that can be understood by one skilled in the art within the scope of the present disclosure.

This application is based upon and claims the benefit of priority from European patent application No. 18204190.5, filed on Nov. 2, 2018, the disclosure of which is incorporated herein in its entirely by reference.

REFERENCE SIGNS LIST 1 telecommunication system
3 mobile device
31 transceiver circuit
33 antenna
35 user interface
37 controller
39 memory
41 operating system
43 communications control module
300 UE
301 memory unit
302 application processor unit
303 baseband processor unit
304 RF transceiver
5 base station
51 transceiver circuit
53 antenna
55 network interface
57 controller
59 memory
61 operating system
63 communications control module
500 RAN
510 base station
511 memory unit
512 application processor unit
513 baseband processor unit
514 RF transceiver
7 core network
71 transceiver circuit
75 network interface
77 controller
79 memory
81 operating system
83 communications control module
700 CN
710 network equipment
711 memory unit
712 processing unit
713 communication unit
10 CPF
11 UPF
20 external IP network

The invention claimed is:

1. User Equipment (UE), comprising:
one or more memories configured to store instructions; and
one or more processors configured to execute the instructions to:
send, to a Radio Access Network (RAN) node, first security information for User Plane (UP) integrity protection,
receive, from the RAN node, second security information for the UP integrity protection, wherein the second security information is decided by the RAN node for security information negotiation, and
generate a Packet Data Convergence Protocol (PDCP) Protocol Data Unit (PDU) including a PDCP header, data, and a Message Authentication Code-Integrity (MAC-I) using the second security information, wherein the PDCP header comprises at least one bit that indicates whether the integrity protection is used in the PDU or not.

2. The UE of claim 1, wherein the RAN node is a Next-generation NodeB (gNB).

3. A method of a User Equipment (UE), the method comprising:
sending, to a Radio Access Network (RAN) node, first security information for User Plane (UP) integrity protection;
receiving, from the RAN node, second security information for the UP integrity protection, wherein the second security information is decided by the RAN node for security information negotiation; and
generating a Packet Data Convergence Protocol (PDCP) Protocol Data Unit (PDU) including a PDCP header, data, and a Message Authentication Code-Integrity (MAC-I) using the second security information, wherein the PDCP header comprises at least one bit that indicates whether the integrity protection is used in the PDU or not.

4. The method of claim 3, wherein the RAN node is a Next-generation NodeB (gNB).

5. The UE of claim 1, wherein the one or more processors further configured to execute the instructions to:
when the UE receives a PDCP Protocol Data Unit (PDU) which fails integrity check, discard the received PDU and send an error indication related to the failed integrity check.

6. A Radio Access Network (RAN) node, comprising:
one or more memories configured to store instructions; and
one or more processors configured to execute the instructions to:

receive, from a User Equipment (UE), first security information for User Plane (UP) integrity protection, send, to the UE, second security information for the UP integrity protection, wherein the second security information is decided by the RAN node for security information negotiation, and generate a Packet Data Convergence Protocol (PDCP) Protocol Data Unit (PDU) including a PDCP header, data, and a Message Authentication Code-Integrity (MAC-I) using the second security information, wherein the PDCP header comprises at least one bit that indicates whether the integrity protection is used in the PDU or not.

7. The method of claim 3, further comprising:
when the UE receives a PDCP Protocol Data Unit (PDU) which fails integrity check, discarding the received PDU and sending an error indication related to the failed integrity check.

8. A method of a Radio Access Network (RAN) node, comprising:

receiving, from a User Equipment (UE), first security information for User Plane (UP) integrity protection;

sending, to the UE, second security information for UP integrity protection, wherein the second security information is decided by the RAN node for security information negotiation; and generating a Packet Data Convergence Protocol (PDCP) Protocol Data Unit (PDU) including a PDCP header, data, and a Message Authentication Code-Integrity (MAC-I) using the second security information, wherein the PDCP header comprises at least one bit that indicates whether the integrity protection is used in the PDU or not.

* * * * *